UNITED STATES PATENT OFFICE.

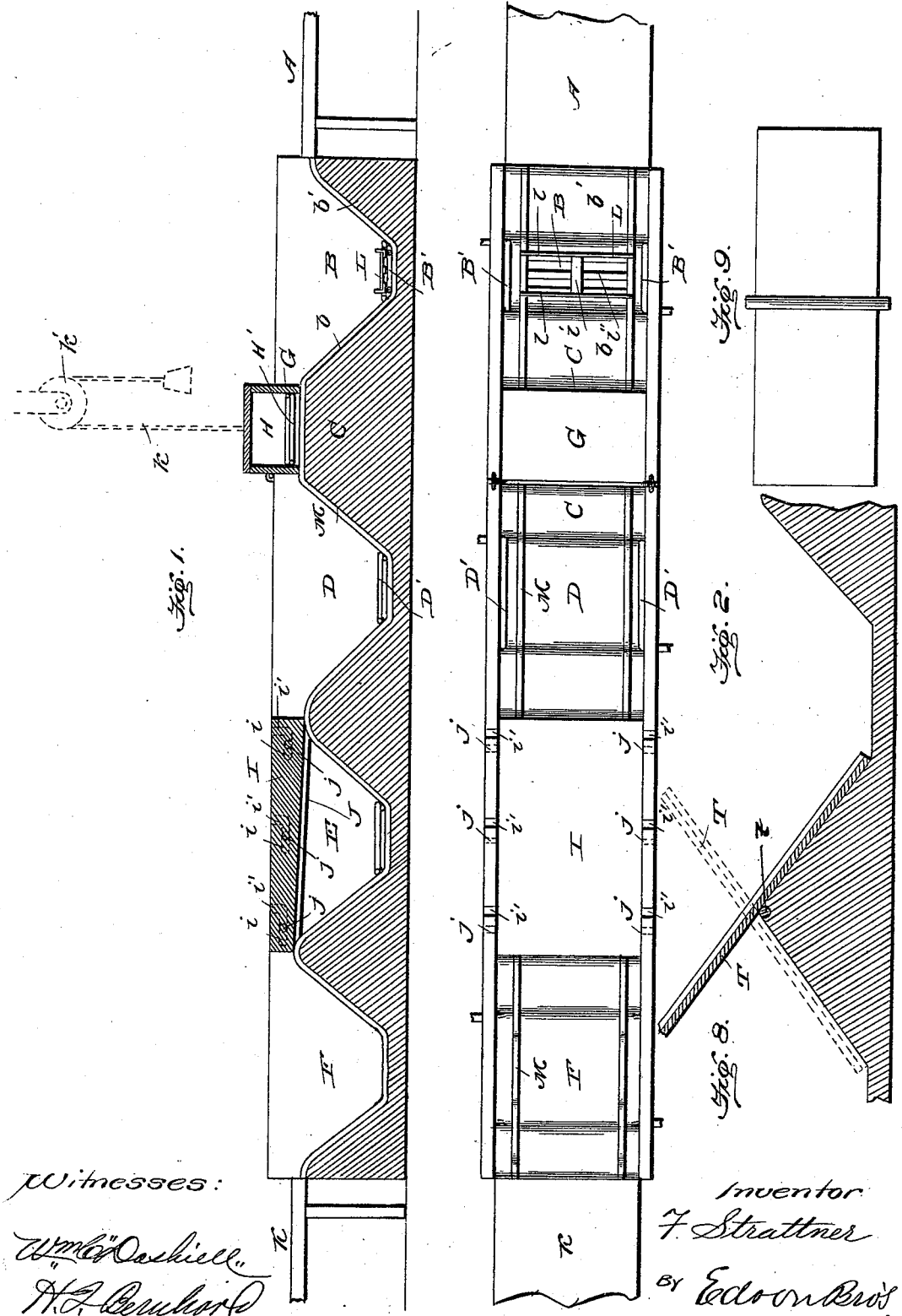

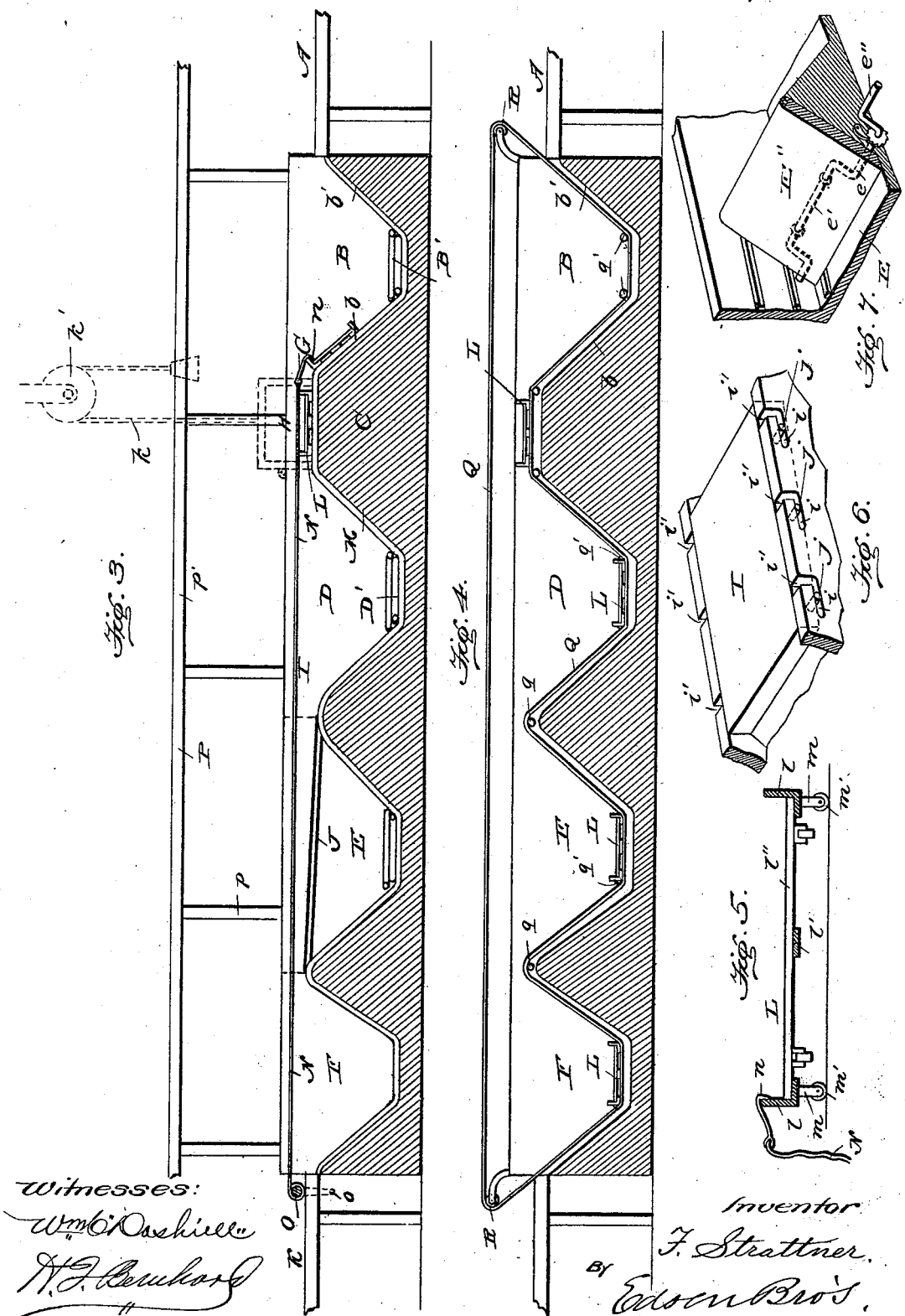

FREDERICK STRATTNER, OF SALISBURY, MARYLAND.

APPARATUS FOR FILLING CANS AND COOKING THE CONTENTS THEREOF.

SPECIFICATION forming part of Letters Patent No. 512,919, dated January 16, 1894.

Application filed April 5, 1893. Serial No. 469,179. (No model.)

*To all whom it may concern:*

Be it known that I, FREDERICK STRATTNER, a citizen of the United States, residing at Salisbury, in the county of Wicomico and State of Maryland, have invented certain new and useful Improvements in Apparatus for Filling Cans and Cooking the Contents Thereof; and I do hereby declare the following to be a full, clear, and exact description of the invention, such as will enable others skilled in the art to which it appertains to make and use the same.

This invention relates to an apparatus for filling cans and cooking or preserving their contents, and the object I have in view is to provide for the convenient and expeditious filling and cooking of fruits or vegetables in cans under a continuous process or operation, thus saving the time and labor required in the manual manipulation of the filled cans at each of the various steps of the operation of capping, cooking and cooling of said filled cans. To the accomplishment of these ends, I provide my apparatus with a capping table adapted to be inclosed within a steam-tight box and forming therewith an exhausting chamber adapted to be heated by dry heat to expel or exhaust the atmosphere from the contents of the cans; one or more cooking vats or chambers in juxtaposition to the capping table and its exhausting chamber; and a cooling vat, with which devices I combine a suitable form of carrier mechanism by which the filled cans can be successively conveyed from the capping table into either of the cooling vats and thence into the cooling vat, whereby the operation of exhausting the air from the filled cans, capping the cans, cooking the contents of the cans, and finally cooking the same can be continuously carried on without requiring the cans to be handled at each step of the operation, and thus effect a material saving in the time and labor required for the proper preservation of the contents of the cans.

In the preferred embodiment of my invention, I provide two preserving or cooking vats, one of which is an open or exposed vat adapted to be partially filled with a suitable fluid and heated by steam pipes so that soft fruits can be conveniently and expeditiously cooked; while the other cooking vat is designed to be hermetically closed by a tight fitting cover of novel construction, and heated to quite a high temperature, say 230° or 240° Fahrenheit, and under considerable pressure, so that vegetables, such as corn, can be quickly and thoroughly cooked therein. If preferred, however, the apparatus may have a single tightly closed vat designed for cooking both hard and soft foods to remain in said closed vat for a shorter period of time than the corn and other similar foods which do not cook quickly.

As the preferred form of carrier mechanism I employ a series of two or more traveling crates or carriages which are independent of each other and are adapted to be hauled through the apparatus by means of a hauling cable, one end of which is provided with a hook to detachably connect the cable to one of the crates or carriages while the other end of said cable is fastened to a winding shaft, journaled in bearings at one end of the apparatus and provided with a hand crank for its convenient operation, so that the rear carriage or crate can be made to shove or force the crates or crate in front of it through the vat, or several vats, of the apparatus. But I do not strictly limit myself to the use of this particular form of carrier mechanism as I may employ an endless carrier conveyer or apron arranged to travel through the vats, into which it is positively depressed by suitable guide mechanism, so that the conveyer follows the course or contour of the several vats and over the capping table.

The invention further consists in the novel combination of devices and peculiar construction and arrangement of parts as will be hereinafter more fully described and claimed.

I have illustrated the different embodiments of my invention in the accompanying drawings, forming a part of this specification, and in which—

Figure 1 is a longitudinal sectional view through the preferred construction of my apparatus for filling cans and cooking the contents thereof, with the elevated track for returning the crates omitted. Fig. 2 is a top plan view of the apparatus shown by Fig. 1. Fig. 3 is a similar sectional view with the raised track in position. Fig. 4 is a sectional view of the apparatus with an endless carrier apron or conveyer constructed to travel through the series of vats or chambers. Fig. 5 is a detail view of one of the wheeled crates and a part of the hauling cable connected thereto. Fig. 6 is an enlarged detail view of the closed cooking vat, illustrating the construction by which the cover is tightly closed over the vat. Fig. 7 is a detail view of one of the vats with an adjustable inclined side wall to permit the same to assume different inclinations and to prevent the wheeled weighted crates from descending too rapidly into the vat. Fig. 8 is another modified construction of one vat also the tracks to receive the wheeled crates showing a tumbling table for use in connection therewith. Fig. 9 is a plan view of the tumbling table shown by Fig. 8.

Like letters of reference denote corresponding parts in all the figures of the drawings, referring to which—

A designates a table on which the cans filled with fruit can be placed preliminary to being drawn through the apparatus; B is the sirup-vat adjacent to the table A; C is the capping table on which the caps are placed and sealed on the cans by hand; D, E, are the cooking vats, one of which, D, is an exposed vat for cooking or preserving soft fruits or vegetables while the other vat, E, is closed tightly by a cover to cook foods, such as corn, under pressure; and F is the cooling vat, wholly or partially filled with a cold-water bath through which the cans are drawn to cool the contents thereof, all of which parts or structures are situated adjacent to one another and so constructed that the carrier or carriers with the cans thereon can be moved successively through the same in the operations of capping the cans, preserving or cooking the contents thereof, and cooling the cans and contents without handling each can separately at each stage of the operation.

The sirup-tank B has a heating coil B' therein, and its walls $b$, $b'$, are inclined reversely to each other, the receiving table A being flush with or above the upper edge of one of the walls $b$ while the capping table C is flush with or on a higher level than the upper edge of the other wall $b'$ of said sirup vat B. This capping table lies between the continuous side walls of the apparatus, below the upper edges thereof; and said capping table forms, in connection with a movable steam-box G, an exhausting chamber H in which the air is driven off or exhausted from the contents of the filled cans by means of dry heat. The steam-box G is adapted to fit tightly between the side walls of the apparatus and upon the top of the capping table; and heat is supplied to this chamber H by a heating pipe or coils H' arranged in series at one or both sides of the chamber, said pipes or coils extending through the side walls of the apparatus to a convenient source of heat-supply and so as to avoid interference with the movement of the box G which must be adjusted to expose the table C so that the attendant can place and seal the caps on the cans while they are on the table C. I preferably hinge or pivot the box G at one side of the table C so that the box can be raised and turned to one side of the table C, in which position it serves as a shield to the operator standing alongside of the adjacent cooking vat; but this cover can be moved bodily in a vertical direction so as to be entirely out of the way of the attendant, by means of a hoisting cable or chain $k$ which is attached at one end to the box G and runs over an elevated sheave or pulley $k'$, a balance weight or hand piece $k''$ being provided at the free end of the chain or cable $k$.

The cooking or preserving vats D, E, are situated at one side of and in line with the capping table and with each other, and each vat has the inclined walls as shown, to permit the wheeled crates to readily pass into and from the vats. The vat D is an open or exposed vat designed to be partially filled with water or other suitable fluid which is heated to the proper temperature by means of the heating pipes or coils D' situated at one or both sides of the vat and extending through the side walls of the apparatus to a convenient source of heat-supply such as a steam boiler or furnace. This open or exposed vat D is intended for cooking soft fruits or vegetables, such for instance as peaches; and in some cases this open or exposed cooking vat D may be dispensed with, to effect economy in the construction of the plant or apparatus, the closed or sealed vat E being employed for cooking soft and hard fruits or vegetables. This closed vat E is heated by the pipes or coils E' situated at one or both sides of its chamber, and the top or upper side of this vat E is closed by means of the cover I which is fitted and forced tightly against the upper edges of the walls of the vats and between the continuous side walls of the apparatus. This cover I is preferably made flat as shown, and it is tapered longitudinally to present the wedge form in longitudinal section.

In the continuous side walls of the apparatus, I provide a series of three or more slots, $i$, each having a vertical extension $i'$ at one end, and each side of the cover I is provided with a corresponding number of bosses or studs $j$ which are adapted to pass through the extensions $i'$ when the cover is fitted over the vat E and to slide longitudinally in the slots when the cover is pushed or forced endwise over the said vat E.

Below the cover I, and on both side walls of the apparatus, is provided the flanges or ledges J, which are inclined somewhat as shown, and as the cover is pushed endwise after its studs are fitted in the slots, the lower face or side of the cover bears or rides against the flanges J and binds thereon so as to secure the necessary tight joint between the cover and the vat or chamber E, thus obviating the use of packings and sealing the vat so that the necessary pressure can be secured in the vat for cooking the fruits and vegetables.

The cooling vat F is situated at one side and in line with the cooking vat E, and it is either partially or wholly filled with cool or cold water so that the cans and their contents can be cooled before they are delivered onto the final table K for finishing and storage.

L is the wheeled crate or carriage which I preferably employ for conveying the filled cans through the vats of the apparatus. A series of these crates or carriages may be employed, and each crate consists of the end bars $l, l$, made of angle iron as shown, a transverse middle bar, $l'$, and a series of horizontal slats $l''$ rigidly fastened at their ends to the angle bars and forming the bottom to the crate, on which bottom the cans rest and they are held in place by the vertical parts of the angle bars $l, l$, at the ends of the crate. Each crate is further provided, at its angles or corners, with the depending lugs or brackets, $m$, in which are loosely journaled the carrying wheels $m'$ of any suitable form; and these wheels travel on the tracks M provided on the capping table and the several vats, the rails of the tracks being continuous and in line so that the crate can travel throughout the length of the apparatus. The heating pipes or coils in the several vats and the capping table are at one side of the track M so that the wheeled crate can move with its load through the apparatus without hinderance from the heating pipes or coils.

As a convenient means for hauling the crate and its load through the apparatus, I provide the hauling cable N which is provided at one end with the hook $n$ adapted to take over the angle bar at one end of the crate. The other end of this hauling cable is attached to a winding shaft O which is journaled in suitable bearings at the delivery end of the apparatus, contiguous to the delivery table opposite to the cooling vat F. This winding shaft O is provided at one end with a hand crank $o$ by which it can be conveniently rotated or turned to coil the cable N thereon and draw the crate through the vat, or vats, and as the cable is provided with the hook $n$ it can readily be disconnected from one crate and attached to another crate. It is not necessary to attach the cable to each crate to draw the same through the apparatus when a series of crates are employed, as the cable can be attached to the last crate of the series and said last named crate can be pulled or hauled by the cable so as to shove or force the crates in advance of the same through the apparatus. These crates are made oblong or rectangular in form, as shown, and as a convenient means for returning the crates to the front end of the apparatus I employ an elevated track or way P which extends longitudinally of the apparatus, over the series of vats and the capping table thereof, to the primary receiving table A. This track or way is supported in its elevated position by means of the uprights or posts $p$ which are attached to the continuous sides of the apparatus; and these uprights or posts are inclined reversely to each other so that they diverge from the sides of the apparatus, and the longitudinal stringers or rails $p'$ of the track or way P are separated farther apart than the distance between the sides of the apparatus, whereby the steam-box G and the cover I can be raised or lowered without hinderance from the elevated track and its supporting means. As the track P is wider than the width of the crates L, the latter should be turned lengthwise across the track so as to rest thereon and for the convenient movement of the crates on the track or way P, the crate may have small carrying rolls, the axes of which are at right angles to the shafts of the wheels $m'$, but this is an obvious expedient, and may be omitted.

This being the construction of the preferred form of my invention, the operation may be briefly described as follows: If soft fruits or vegetables are to be preserved, the cans are filled by the peelers and placed on crates on the receiving table A. In the case of soft fruit required to have a sirup in the cans, the tank B is filled with a suitable sirup and heated, and the crate is hauled through the vat B by the table N so that the sirup therein can readily enter the openings in the tops of the cans, and the crate is then hauled upon the capping table, the steam-box G being raised to permit the crate to readily pass onto the table C. The steam-box G is now lowered to form tight joints with the table and apparatus, and steam or other heat is admitted to the heating coils therein so as to heat the chamber H sufficiently to expel the atmosphere from the contents of the cans. The steam-box G is now raised, and the caps are placed and sealed on the cans by hand. The crate is now hauled into the cooking vat D and allowed to remain therein a sufficient length of time to cook the soft fruit; or said crate may be hauled directly into the vat E, the cover I closed thereon, and the fruits or vegetables allowed to remain in said closed vat a sufficient length of time to cook the same, after which the cover I is raised and the crate hauled into the cooling vat F, and finally onto the table adjacent to said vat F. When a vegetable is to be cooked, or a fruit which does not require sirup in the cans, the crate may be hauled upon the capping table, and the cans of fruit or vegetables from the peelers are placed on the crate on said capping table, without being passed through the sirup vat, after which the steam-box is lowered, heat turned on to expel or exhaust the air from the caps, the box G raised, the caps placed on the cans, and the crate hauled into the cooking vat so as to cook or preserve the contents of the cans, and finally into the cooling vat, and onto the delivery table. As hereinbefore stated, a series of these crates are used, some of which may be in the cooking and cooling vats while others are in the exhausting chamber and on the capping table, and when a series is so used, the hauling cable may be connected to the last crate only which serves to push or shove the crates in advance thereof through the vats as the rails of the track M are continuous.

In Fig. 7 of the drawings, I have shown the vat E provided with a movable side wall E'' which may be adjusted to different inclinations to prevent the crate with its load from descending too rapidly into the vat. This movable wall E'' is pivoted or hinged at or near its upper edge while its lower edge is free, and this adjustment of the wall E'' is effected from the outside of the vat by means of a shaft $e$ which passes through the continuous sides of the apparatus, and in rear of the movable wall E'' to which it is connected so that the carrier or crates can readily pass over the wall E'' without interference from the shaft, said shaft $e$ provided within the vat with the cranked part $e'$ which is connected to the free edge of the movable wall E'' while one end of the shaft is provided with a crank $e''$ outside of the apparatus and with ratchet and pawl mechanism for holding the shaft and the movable wall E'' to their adjusted positions. The wall E'' can thus be readily raised or lowered by means controlled from the outside of the vat, and the weighted crate can thus be prevented from descending too rapidly into the vat. It is obvious that each of the vats B, D and E may be similarly provided with the movable wall E'' and with means for raising and lowering said movable wall; but I have not deemed it necessary to illustrate each vat with this movable wall E'', as the construction and operation thereof will be readily understood by those skilled in the art from the foregoing description taken in connection with Fig. 7. I may also use a tumbling table T for conveniently transferring the weighted crates from one vat to another. This tumbling table is made quite long, and it is pivoted centrally to the apex of the inclined walls between two adjacent vats, as at $t$ in Fig. 8; one end of the tumbling table being lowered into one vat while the other end of said table projects above the other vat. This tumbling table may be provided with rails forming a continuation of the track on which the wheeled crates are designed to run; and when a crate is hauled upon the table, and passes the pivot or center $t$ thereof, the weight of the crate causes the table to be automatically inverted or reversed so that the crate and its contents will readily pass from one vat into the other.

In the modified embodiment of my invention shown by Fig. 4 of the drawings, I dispense with the hauling cable and the elevated track or way P for returning the crates to the table A of the apparatus; and in lieu thereof I employ an endless carrier or apron Q which travels through the vats and is guided and depressed therein by means of the guide pins or shafts $q$, $q'$ situated at the bottom and top of the vats and on opposite sides of the table C. This endless carrier passes around suitable guide rolls, R, R, at opposite ends of the apparatus, which guide-rolls are sustained in elevated positions above the vats and tables by means of the upright frames or supports S, so that the crates can be carried back from the delivery end of the apparatus to the receiving table A, as will be readily understood.

If desired, a series of tracks or ways may be arranged one above the other in one or more of the vats, as indicated in Fig. 8 of the drawings, whereby a tier or vertically disposed series of crates may be contained in one of the cooking or cooling vats.

I am aware that changes in the form and proportion of parts, and in the details of construction, of the mechanisms herein shown and described as an embodiment of my invention, can be made without departing from the spirit or sacrificing the advantages thereof, and I therefore reserve the right to make such modifications and alterations as fairly fall within the scope of the invention.

Having thus fully described my invention, what I claim as new, and desire to secure by Letters Patent, is—

1. In an apparatus for filling cans and cooking the contents thereof, the combination of a capping table C, a movable steam-chest constructed to fit tightly on said capping table and producing, in conjunction therewith, an exhausting chamber, a cooking vat alongside of said capping table, and carrier mechanism for conveying cans to the capping table and through said cooking vat, substantially as and for the purposes described.

2. In an apparatus for filling cans and cooking the contents thereof, the combination of a capping table C, a movable steam-chest constructed and arranged to fit tightly upon said capping table and forming, in conjunction therewith, an exhausting chamber, a sirup vat at one side of the capping table, a cooking vat on the opposite side of the capping table, suitable heaters in said sirup and cooking vats and in the exhausting chamber, and carrier mechanism for conveying cans through the sirup vat, exhausting chamber and cooking vat, substantially as and for the purposes described.

3. In an apparatus for filling cans and cooking the contents thereof, the combination of a capping table, a vertically-movable steam-chest arranged and constructed to fit tightly upon said capping table and producing, in conjunction therewith, an exhausting chamber, a cooking vat at one side of said capping table and provided with a heater, a cooling vat at one side of the cooking vat, and carrier mechanism arranged to convey cans successively through the exhausting chamber, the cooking vat, and the cooling vat, substantially as described.

4. In an apparatus for filling cans and cooking the contents thereof, the combination of a capping table C, a vertically-movable steam-chest constructed to fit tightly upon said capping table and form an exhaust chamber therewith, a cooking vat at one side of said capping table and provided with a removable cover constructed to tightly close the vat, heating coils within said exhausting chamber and cooking vat, and carrier mechanism for successively conveying cans through the exhausting chamber and cooking vat, substantially as described.

5. In an apparatus for filling cans and cooking the contents thereof, the combination of a capping table, a steam-tight inclosure forming an exhausting chamber in connection with said capping table, an exposed cooking vat in line therewith and provided with means for heating the same, another cooking vat provided with heating pipes and a tight-fitting cover, and carrier mechanism, substantially as and for the purpose described.

6. In an apparatus for filling cans and cooking the contents thereof, the combination of a sirup-vat, a capping table, a movable steam-tight inclosure forming in connection with said capping table an exhausting chamber, the open and closed cooking vats having means for heating the same, a cooling vat, and carrier mechanism, substantially as and for the purpose described.

7. In an apparatus for filling cans and cooking the contents thereof, the combination with a capping table, and a cooking vat, of the traveling wheeled crate adapted to move over said table and through the vat, and a hauling cable adapted to be connected to said crate and to be coiled or wound on a shaft, substantially as and for the purpose described.

8. In an apparatus for filling cans and cooking the contents thereof, the combination with a capping table and a cooking vat, of the series of traveling crates constructed to travel on said table and in the vat, and a hauling cable having means for attachment to either of said crates at will, substantially as and for the purpose described.

9. In an apparatus for filling cans and cooking the contents thereof, the combination of a receiving table, a capping table, a cooking vat, one or more wheeled crates adapted to travel in said vat and capping table, and an elevated way or track arranged above the capping table and vat, to return the crates from the delivery end of the apparatus to the receiving table, substantially as and for the purpose described.

10. In an apparatus for filling cans and cooking the contents thereof, the combination of a capping table, a movable steam-tight inclosure operating in conjunction therewith to form an exhausting chamber, a cooking vat, the wheeled crates and means for hauling the same, and a raised way or track above the capping table and the vat, and so constructed and arranged as to be out of the path or way of the steam-tight inclosure when raised, substantially as and for the purpose described.

11. In an apparatus for filling cans and cooking the contents thereof, a vat having the inclined side and a movable inclined wall, as E'', combined with a cranked shaft or its equivalent for raising and lowering said wall E'' to different inclined positions, as and for the purpose described.

12. In an apparatus for filling cans and cooking the contents thereof, a vat provided with the L shaped slots in side walls and with a longitudinal rib or flange below the slots, combined with a wedge-like cover having lateral studs which fit in said slots of the side walls, said wedge cover being forced tightly against the flange or ledge as it is moved endwise into position over the vat, substantially as and for the purpose described.

In testimony whereof I affix my signature in presence of two witnesses.

FREDERICK STRATTNER.

Witnesses:
L. W. MORRIS,
M. V. BREWINGTON.